April 19, 1960 S. A. McGAVERN, JR., ET AL 2,933,308
EXTENSIBLE DIAPHRAGM FLUID CYLINDER
Filed April 12, 1956 2 Sheets-Sheet 1

INVENTOR.
SANFORD A. McGAVERN JR.
BRUCE W. CAMPBELL
BY
ATTORNEY

April 19, 1960  S. A. McGAVERN, JR., ET AL  2,933,308
EXTENSIBLE DIAPHRAGM FLUID CYLINDER
Filed April 12, 1956  2 Sheets-Sheet 2

INVENTOR.
SANFORD A. McGAVERN JR.
BRUCE W. CAMPBELL
BY
ATTORNEY

United States Patent Office 2,933,308
Patented Apr. 19, 1960

2,933,308

EXTENSIBLE DIAPHRAGM FLUID CYLINDER

Sanford A. McGavern, Jr., and Bruce W. Campbell, Marietta, Ohio, assignors to The Dayton Rubber Company, a corporation of Ohio Application April 12, 1956, Serial No. 577,778

6 Claims. (Cl. 267—15)

This invention relates to fluid cylinders and more particularly to a novel telescoping air cylinder unit employing a telescoping rolling diaphragm. The subject invention may be embodied in a highly compact self-stabilizing fluid cylinder unit which can be accommodated in a minimum of space and yet affords a maximum shock-absorbing displacement stroke when required. Such cylinders may be employed, for example, in air spring suspension systems of a highly improved nature.

Many attempts have been made in the prior art to design a fluid cylinder of an economical yet efficient nature. The great majority of fluid cylinders such as air springs previously devised have employed conventional bellows type diaphragms in a variety of forms. Their suspension and shock-absorbing characteristics have proven to be directly related to their size. Due to their limited capacity, they do not adapt readily to a wide range of load conditions and they are subject to wear and weakening within relatively short periods of hard usage.

The subject invention was initially particularly developed for application in spring suspension systems, for example, for cars, trucks and trailers. The load problems presented and the consequent rough usage to which suspension springs are subjected in trucks and trailers emphasized the need for spring units having wider adaptability and better load-accommodating and shock-absorbing characteristics than those available in the prior art. Prior to the invention the air spring units available did not have the capacity of affording a long expansion stroke in a relatively compact spring unit and maintaining a stable balanced condition thereof irrespective of the load applied thereto. These features are essential to enable a practical and efficient air spring suspension system for cars and trucks. The air spring unit provided by the invention corrects the deficiencies of the prior art air springs and affords a flexible and highly efficient suspension system in their use. The embodiment of the invention provides a telescoping rolling diaphragm of a generally tubular nature which is contained in spring mounting cups at its extremities and selectively intermediately thereof so that on application of the spring units and provision for a predetermined fluid pressure therein a floating suspension system obtains. In its preferred embodiment the diaphragm is centrally restricted and contained by a sleeve that floats intermediate the mounting cups in generally nested fashion to balance and stabilize the spring unit provided thereby. The cups and the central sleeve are so related to the rolling diaphragm that under maximum load they will nest in a compact shock-absorbing relation and afford an unusually long expansion stroke as required. As illustrated herein, the spring unit is shown as a sealed unit, but it will be recognized by those versed in the art that such units may be tapped for connection to a central air reservoir in the well-known manner to enable a variable air pressure to be provided therein and/or to increase the effective volume of air available to absorb any shock loading.

An object of the invention is to provide a novel fluid cylinder unit employing a telescoping rolling diaphragm.

Another object of the invention is to provide an improved fluid spring unit of a highly compact nature which affords a long shock-absorbing stroke yet can be accommodated in a minimum of space.

An additional object of the invention is to provide a new and improved air spring unit including a telescoping rolling diaphragm contained at its respective ends by spring mounting cups so connected thereto as to provide a balanced floating suspension unit.

A further object of the invention is to provide a novel air spring including a telescoping rolling diaphragm contained at its respective ends in a sealed condition by spring mounting cups and intermediate thereof by a restricting sleeve which automatically stabilizes the diaphragm and centers itself in floating relation to the spring mounting cups irrespective of the load conditions thereon.

Another object of the invention is to provide an improved air spring including a telescoping rolling diaphragm contained at selected spaced portions longitudinally thereof by spring mounting and stabilizing elements so fabricated to substantially completely nest relative each other on maximum load conditions being applied to the spring unit.

Another object of the invention is to provide a novel air spring unit possessing the advantageous structural features, the inherent meritorious characteristics, and the mode of operation herein described.

With these primary and other incidental objects in view, as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein are found the preferred but obviously not necessarily the only form of embodiment of the invention:

Figure 1:
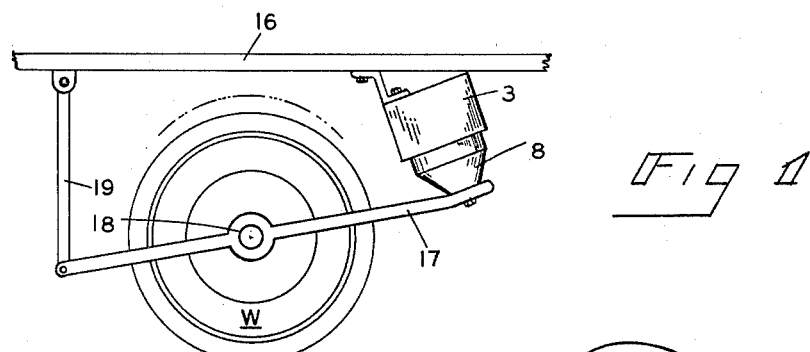
Figure 1 is a fragmentary elevation view showing the novel spring unit as applied in an air suspension system for a trailer.
Figure 2:
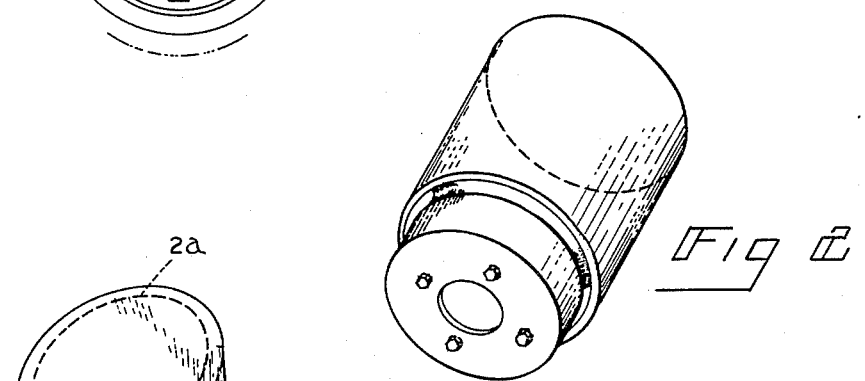
Figure 2 is a perspective view of the spring unit of Figure 1 shown in its nested condition.
Figure 3:
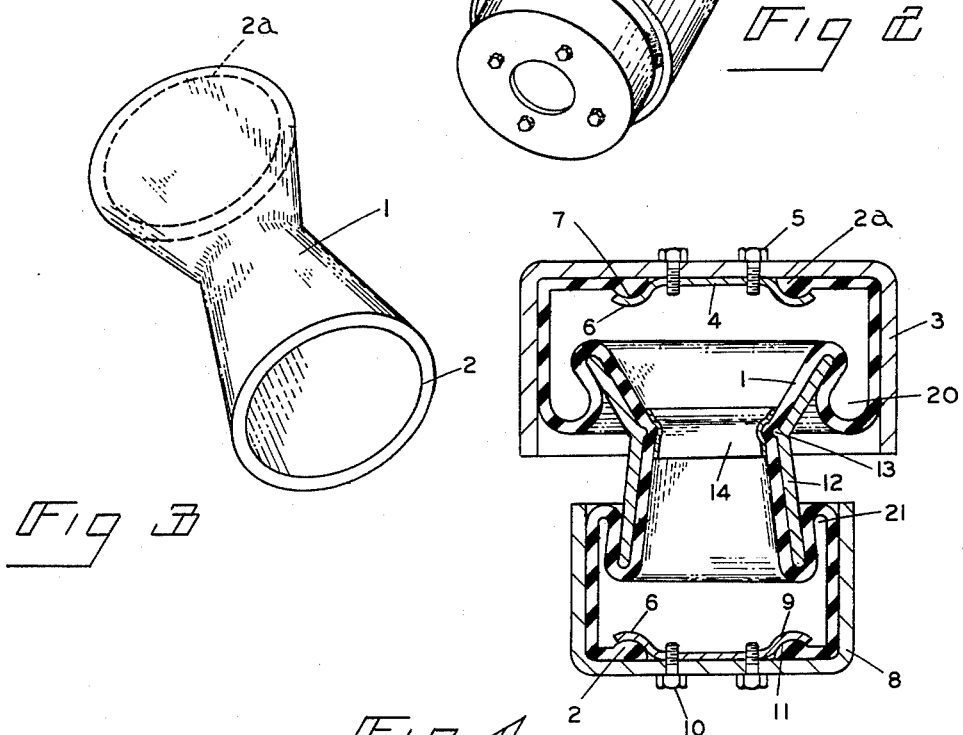
Figure 3 is a perspective view of the diaphragm element employed in the spring unit shown in its extended condition.

The invenion can best be described with reference to the accompanying drawings, wherein one preferred embodiment in the form of an air spring for vehicular suspension systems is shown in Figures 2–6 thereof. It consists of a resilient telescopic rolling diaphragm 1 of a generally tubular or cylindrical nature formed to effect a convergent-divergent configuration. The extremities of the diaphragm are provided with internal beaded portions 2 and 2a respectively. Over and about the beaded extremity 2a of the diaphragm is seated a mounting cup 3 of a strong and rigid material. A circular plate 4 is connected in adjustable relation to the inner surface of the cup 3 by screws 5. The periphery 6 of the plate 4 is uniformly offset from the central portion thereof to provide a circular recess 7 therein opposed to the inner surface of the cup 3. The bead 2a on the diaphragm is engaged in the recess 7 in the plate 4 and on adjustment of the screws 5 the plate 4 is drawn centrally into engagement with the inner surface of the cup, the bead 2a being clamped in sealing relation to the cup by the peripheral portion 6 of the plate.

A spring mounting cup 8, similar to the cup 3 but smaller in external diameter, is seated to and about the other extremity 2 of the diaphragm. The bead on the extremity 2 is sealingly clamped to the inner surface of the cup 8 by a circular clamping plate 9 having a configuration identical with that of plate 4. The plate 9 is engaged to the cup 8 by screws 10 which draw the recessed periphery 11 of the plate 9 in clamping relation to the bead of the diaphragm to seal it to the cup.

A convergent-divergent sleeve 12 is mounted on the external surface of the diaphragm 1 at the intermediate portion thereof. This provides a centrally pinched or necked down effect to the diaphragm which corresponds with the smallest diameter of the sleeve. The sleeve itself, therefore, consists of two truncated cones which are joined at their minimum diameters to provide this shape. The sleeve 12 at its narrowest diameter is provided internally thereof with a circular projection 13. A narrow convergent-divergent spring retainer band 14 is provided internally of the diaphragm 1, and is concentric with the sleeve at the minimum diameter. The spring band 14 has a configuration similar to that of sleeve 12 and clamps the diaphragm to the inner surface thereof. The band 14 is provided with an external circular recess 15 therein opposed to the projection 13 in sleeve 12 so that a firm and positive seating of the diaphragm in the recess 15 of the band 14 is effected by the projection 13. The maximum diameters or ends of the sleeve 12 adjacent each of the cups 3 or 8 will be smaller than the cup and may pass telescopically into the same. At the same time the cup 8 is smaller than the opening in cup 3 so that these cups will telescope together to provide the nested arrangement of cups and sleeve shown in Figure 6. A sealed telescoping rolling diaphragm air spring unit is thus effected in accordance with the invention. Of course, the proper or desired air pressure is provided in the spring unit within the sealed diaphragm in accordance with its intended application. This may be done in any suitable manner.

Figure 4:
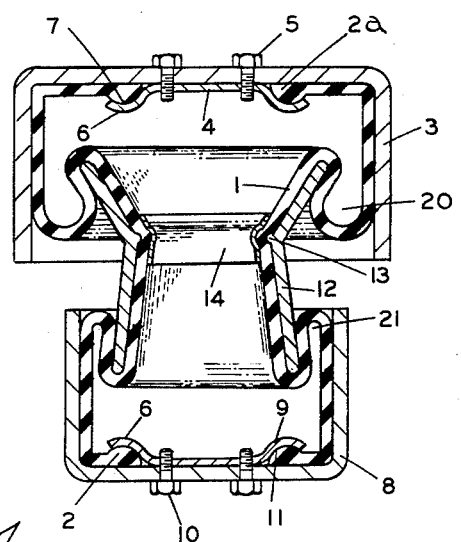
Figure 4 is a longitudinal cross-sectional view of the novel air spring as seen under normal load condition.
Figure 5:
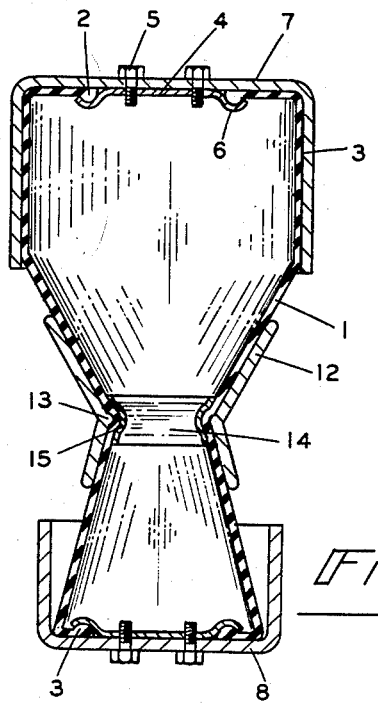
Figure 5 is a cross-sectional view similar to that of Figure 4 showing the spring unit in its fully extended balance condition.
Figure 6:
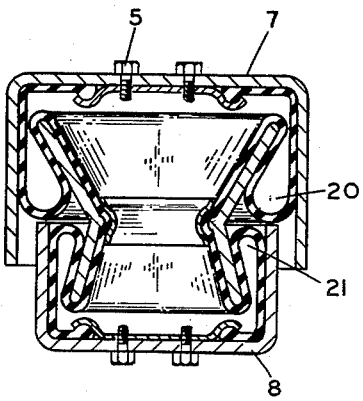
Figure 6 is a cross-sectional view similar to that of Figure 4 showing the spring unit under maximum load conditions.

The novel spring unit thus provided may be employed, for example, in a trailer suspension system as indicated in Figure 1 of the drawings. As shown therein, the upper spring cup 3 of the spring unit is connected to the trailer bed 16 in any suitable manner while the lower spring mounting cup 8 is connected to a bar 17 intermediately mounted on axle 18. The other end of bar 17 is pivotally linked to the trailer bed 16 by bar 19 forwardly of the trailer wheel W. The novel spring unit affords a unit which has considerable compactness yet will accommodate a long expansion stroke without affecting its complete balance. As shown in Figure 4 of the drawings, the relation of the cups 3 and 8 and the intermediate sleeve 12 under normal load conditions establishes the cups in spaced relation in a longitudinal sense with each being in partially cupping relation to the opposite extremities of the sleeve 12. This disposition of sleeve 12 also provides that the rolling diaphragm 1 is in partially cupped relation to the extremities of sleeve 12. This creates annular pressure pockets 20 and 21 laterally about the sleeve 12 due to the divergent nature of the respective extremities thereof. Of course, the air introduced within the sealed diaphragm provides an internal air pressure thereto that accommodates this cupped relation of the rolling diaphragm about the respective divergent extremities of sleeve 12 under normal load conditions. The annular air pockets 20 and 21 laterally contain and cushion about the diverging extremities of the sleeve 12 to establish the sleeved intermediate portion of the diaphragm in floating balanced relation to the extremities of the diaphragm. Due to the angular disposition of the rolling diaphragm as it conforms to the external divergence of sleeve 12 under load conditions, upon telescoping of the cup elements 3 and 8 due to varying load conditions on the spring unit, lateral and axial balancing of the sleeved portion of the diaphragm obtains under the influence of the air pockets 20 and 21 thereabout. The partially nested normal relation of the spring elements provides that under maximum load conditions that a complete nesting of the sleeve 12 within the telescoped mounting cups 3 and 8 will obtain. This is illustrated in Figure 6 of the drawings. The sleeve 12 maintains its floating condition at all times and this insures a balanced spring unit having maximum shock absorption characteristics. And an unusually long expansion stroke is accommodated by providing this structural feature as can be readily seen from Figure 5 of the drawings. In such instance the cups 3 and 8 are completely displaced from their cupping relation to the sleeved portion of the diaphragm as the diaphragm is extended to its limits. The intermediate sleeved portion then exerts a stabilizing and balancing influence to urge the spring elements to return to their nesting relation when the extending influence is removed whereby the rolling diaphragm cups once more about and under the diverging extremities of the sleeve 12 thereof.

Thus, a novel air spring unit obtains by the use of a telescoping, sealed rolling diaphragm which is laterally contained only at a central restricted portion thereof which is established in floating balancing relation to the ends of the diaphragm under all load conditions. This enables a highly compact suspension and shock-absorbing unit providing a long expansion stroke and maximum shock-absorbing characteristics in a highly stabilized manner. The device can serve with high efficiency as a suspension spring unit or in any other capacity where a stable shock-absorbing unit is required.

Figure 7:
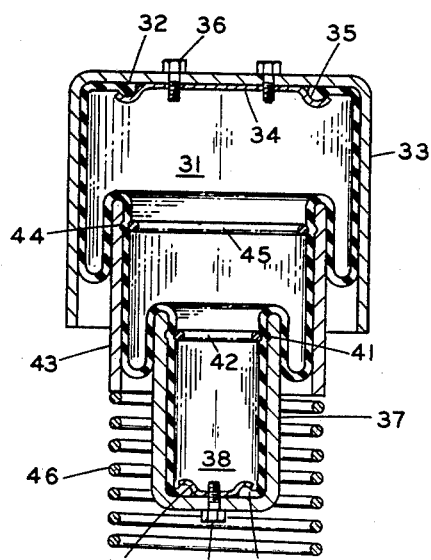
Figure 7 shows a longitudinal cross-sectional view of a modification of a spring unit as shown in Figures 2–5.

A modification of the invention is shown in Figure 7 of the drawings. As seen therein, a telescoping rolling diaphragm 31 is employed which is formed in cylindrical fashion of resilient material so that successive sections thereof are successively reduced in diameter. As shown, the upper end of the diaphragm 31 is provided with an internal bead 32. A cup 33 mounts about the upper end of the diaphragm and has a plate 34 adjustably connected to the inner surface thereof by screws 36. The plate 34 has a circular recess 35 in the face thereof opposed to the inner surface of the cup 33. The screws 36 are adjusted to draw the plate 34 thereto, the bead 32 of the diaphragm being engaged in the recess 35 in the plate in the process and clamped thereby in sealing relation to the inner surface of the cup 33. The cup 33 cups about the upper section of the diaphragm thereby which has the largest diameter thereof. The lowermost section of the diaphragm has its smallest diameter and is provided with an internal bead 36 at its extremity. A spring cup 37 having an internal diameter conforming to that of the lowermost section of the diaphragm is mounted in cupped relation thereto. The bead 36 of the diaphragm is clamped in sealing relation to the inner surface of the cup 37, centrally thereof by a plate 38 adjustably connected to the cup 37 by screws 39. The plate 38 has a circular recess 40 accommodating the bead 36 as it effects a seal thereof to the cup 37. The internal surface of the cup 37 adjacent the open end thereof is provided with an annular recess 41. A retainer ring 42 within the diaphragm clamps the diaphragm to the cup 37 within the recess 41 therein. A cylindrical sleeve 43 is mounted about the central portion of the diaphragm which is of an intermediate diameter. The sleeve 43 has an internal annular recess 44 therein adjacent the upper end thereof. And a retaining ring 45 is provided within the diaphragm which clamps the diaphragm into the recess 44 in the sleeve 43 to mount the sleeve in supported relation to the diaphragm centrally thereof. Since the cylinder 43 unlike the sleeve 12 of Figures 4, 5 and 6 is not capable of centering itself vertically of the unit, auxiliary means such as the coil spring 46 are employed to support the weight of the cylinder and to hold it in its desired position subject to being moved axially as the load conditions influencing the cylinder require.

Air or other inflating medium under a predetermined pressure is introduced in the sealed diaphragm to establish a normal balance thereof wherein the cup 33, the sleeve 43, and the cup 37 are in partially telescoped condition, as shown in Figure 7 of the drawings. Under such condition, the rolling diaphragm respectively provides cupped portions thereof about the central cylindrical sleeve 43 and about the open end of the lower cup 37 to effect annular air pockets thereabout. The nature of the diaphragm material is such that the central sleeve 43 floats in balancing stabilizing relation to the cupped extremities of the diaphragm. The cupped normal relation of the elements provides a compact spring unit affording a relatively long expansion and shock-absorbing stroke which is continuously stabilized by the balancing central telescopically floating sleeve 43. It is noted that where the application requires it, the unit as shown in Figure 7 of the drawings may be employed with spring mounting means spaced radially of the cup 37 and associated with the sleeve 43 for increased load capacity of the unit, but this is contemplated only in specific applications.

From the above description it will be readily apparent that there is thus provided a device of the character described possessing the particular features of advantages before enumerated as desirable, but which obviously is capable of modification in its form, proportions, detail construction and arrangement of parts without departing from the principle involved or sacrificing any of its advantages. While the drawings, for the sake of clarity, have shown the various components to be substantially spaced, it is preferred that only nominal spacing between the telescoping components be employed for the sake of compactness and reduced wear on the diaphragm.

While in order to comply with the statute, the invention has been described in language more or less specific as to structural features, it is to be understood that the invention is not limited to the specific features shown, but that the means and construction herein disclosed comprises the preferred form of several modes of putting the invention into effect, and the invention is therefore claimed in any of its forms or modifications within the legitimate and valid scope of the appended claims.

We claim:

1. In an air spring suspension system, a fluid cylinder comprising a generally tubular flexible diaphragm, means mounted on and closing one end of said diaphragm providing a rigid base therefor, a second means mounted on and closing the other end of said diaphragm, means fully supported by, mounted on the external surface of, and radially restricting said diaphragm intermediate its ends, said restricting means and that portion of said diaphragm on which it is mounted having a double truncated conical shape.

2. In an air spring suspension system, a fluid cylinder comprising a generally tubular flexible diaphragm, means mounted on and closing one end of said diaphragm providing a rigid base therefor, a second means mounted on and closing the other end of said diaphragm, a sleeve fully supported by, mounted on the external surface of, and radially restricting said diaphragm intermediate its ends, said sleeve consisting of two truncated cones joined at a common minimum diameter, and a recessed retainer band mounted on the internal surface of said diaphragm concentric with said sleeve at said minimum diameter to provide positive seating of said diaphragm on said sleeve.

3. The cylinder of claim 2 in which said sleeve is normally in telescoped relation to said closing means to form annular pressure pockets of air for laterally stabilizing said sleeve and its supporting portion of the diaphragm.

4. In an air spring suspension system, a fluid cylinder comprising a generally tubular flexible diaphragm, a cup mounted on and closing each end of said diaphragm, a double truncated conical sleeve mounted on the external surface of, fully supported by and radially restricting said diaphragm intermediate its ends, the ends of said sleeve and their corresponding portions of the diaphragm telescoping at least partially into said cups during normal operation of said suspension system.

5. The cylinder of claim 4 in which said sleeve and diaphragm are completely telescoped into said cups under maximum load conditions of said suspension system.

6. The cylinder of claim 4 in which the telescoping relationship forms annular pressure pockets of air between the sleeve and the cups to laterally stabilize said sleeve and its supporting portion of the diaphragm.

References Cited in the file of this patent

UNITED STATES PATENTS

| | | |
|---|---|---|
| 894,117 | Clark | July 21, 1908 |
| 1,177,142 | Rudd | Mar. 28, 1916 |
| 2,208,540 | Brown | July 16, 1940 |
| 2,633,155 | Wallerstein | Mar. 31, 1953 |

FOREIGN PATENTS

| | | |
|---|---|---|
| 400,616 | Great Britain | Oct. 24, 1933 |